W. V. TURNER.
COMBINED FLUID PRESSURE AND REGENERATIVE BRAKE.
APPLICATION FILED OCT. 22, 1917.
1,400,841.
Patented Dec. 20, 1921.
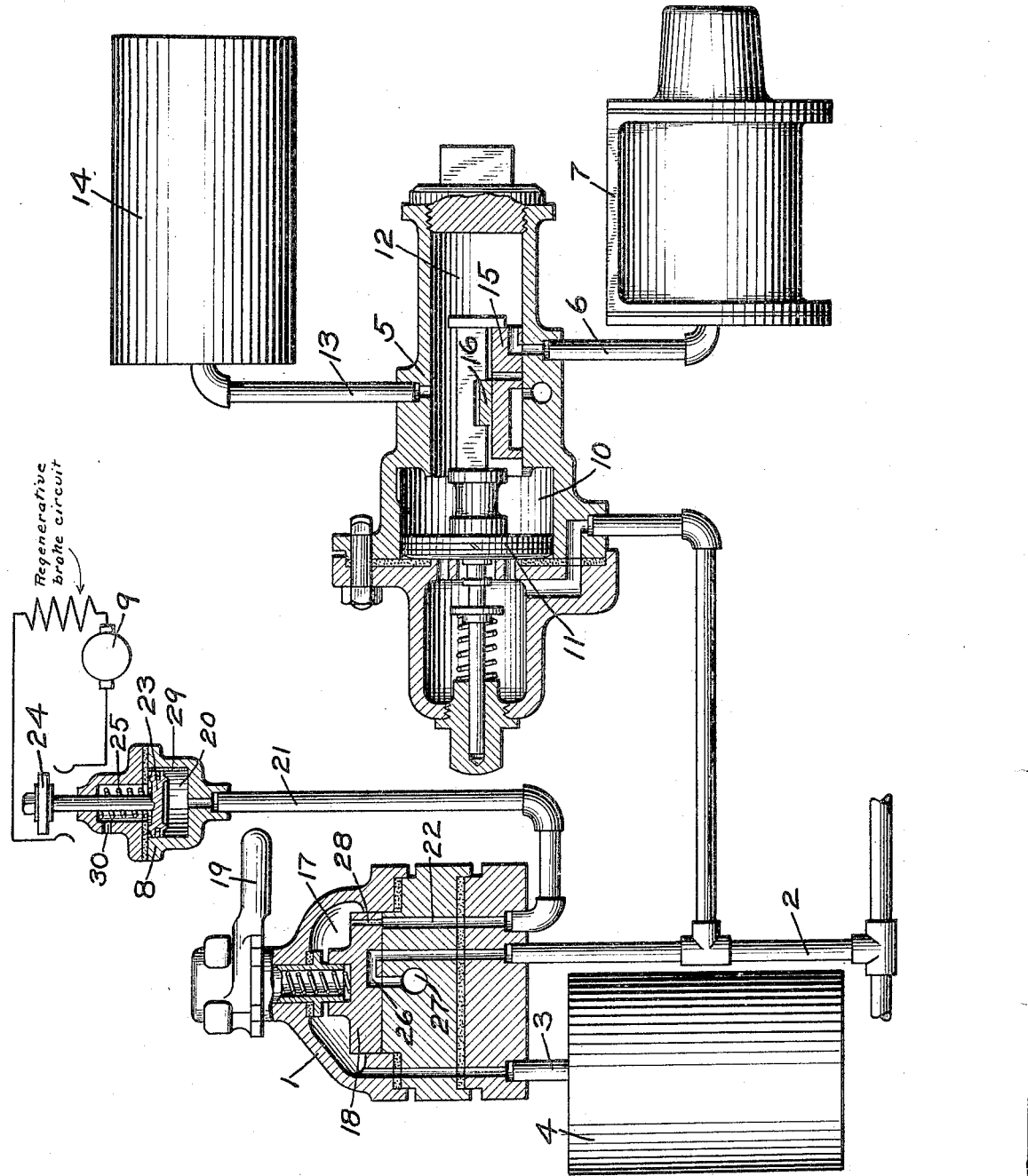
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

COMBINED FLUID-PRESSURE AND REGENERATIVE BRAKE.

1,400,841.  Specification of Letters Patent.  Patented Dec. 20, 1921.

Application filed October 22, 1917. Serial No. 197,805.

*To all whom it may concern:*

Be it known that I, WALTER V. TURNER, a citizen of the United States, residing at Wilkinsburg, in the county of Allegheny and State of Pennsylvania, have invented new and useful Improvements in Combined Fluid-Pressure and Regenerative Brakes, of which the following is a specification.

This invention relates to a combined fluid pressure and electro-regenerative brake system.

With a brake system of the above type, it is not desirable to have the regenerative brake operate when the fluid pressure brake is applied, particularly where an emergency application of the brakes is effected, for the reason that an excessive braking power is thus liable to be produced which is apt to cause wheel sliding and consequently flat wheels.

The principal object of my invention is to provide improved means for cutting the regenerative brake out of action upon applying the brakes by means of fluid under pressure.

In the accompanying drawing, the single figure is a diagrammatic view, partly in section, of a locomotive brake equipment, combined with a regenerative brake, and showing my improvement applied thereto.

As shown in the drawing, the construction may comprise a brake valve 1 connected to brake pipe 2 and by pipe 3 to main reservoir 4, a triple valve device 5, connected by pipe 6 to a brake cylinder 7, and a switch device 8 for controlling the circuit of a regenerative brake 9, which is energized when the regenerative brake is acting.

It will be understood that the switch device 8 controls a circuit of a regenerative brake system, the opening of which will prevent the regenerative brake from acting and since the connection of the switch device to such a circuit would be readily apparent to those skilled in the art it is deemed unnecessary to encumber the drawing with the very complex structure of a regenerative brake and therefore the regenerative brake is merely represented in the drawing as a conventional figure indicated by the reference numeral 9.

The triple valve device 5 may comprise a casing having a piston chamber 10 connected to brake pipe 2 and containing a piston 11 and a valve chamber 12 connected by pipe 13 to an auxiliary reservoir 14 and containing a main slide valve 15 and an auxiliary valve 16 adapted to be operated by piston 11.

The brake valve 1 may comprise a casing having a valve chamber 17 containing a rotary valve 18 adapted to be operated by a handle 19.

The switch device 8 comprises a casing having a piston chamber 20, connected by pipe 21 and passage 22 to the seat of the rotary valve 18 and containing a piston 23 for operating a movable switch contact 24.

In operation, the switch piston 23 is normally maintained in its lower position by the spring 25, so that the movable switch contact 24 closes the regenerative brake circuit, thus permitting the regenerative brake to be operated when desired.

If the brake valve 1 is manipulated to effect an application of the brakes, such as an emergency application, upon turning the brake valve handle to emergency position, as shown in the drawing, the brake pipe 2 is vented to the atmosphere through cavity 26 in the rotary valve 18 and exhaust port 27, thus causing the triple valve device 5 to effect an emergency application of the brakes in the usual manner.

In the emergency position of the rotary valve 18, a through port 28 registers with passage 22, so that fluid under pressure is supplied from the rotary valve chamber 17 to piston chamber 20 of the switch device 8, thus causing the movement of piston 23 to shift the switch contact 24 and open the regenerative brake circuit.

It will thus be seen that upon effecting an emergency application of the brakes, the regenerative brake is automatically rendered inoperative, so that the fluid pressure brake only will be operative to produce braking power.

In order to prevent operation of the switch piston 23 by possible leakage into the pipe 21, a restricted groove 29 may be provided around piston 23, so that any fluid leaking into piston chamber 20 can escape upon a slight lifting of piston 23, through groove 29 and exhaust port 30.

Having now described my invention, what

I claim as new and desire to secure by Letters Patent, is:—

1. The combination with a regenerative brake and a fluid pressure brake having a brake valve, of means operating only upon movement of the brake valve to emergency application position for cutting the regenerative brake out of action.

2. The combination with a regenerative brake and a fluid pressure brake having a brake valve, of a switch for controlling the regenerative brake circuit and a piston operated by fluid supplied from the brake valve upon movement of the brake valve to emergency application position for operating said switch to open the regenerative brake circuit.

3. The combination with a regenerative brake and a fluid pressure brake including a brake valve having an emergency position for effecting an emergency application of the brakes, of a switch for controlling the regenerative brake circuit, and a piston operated by fluid supplied from the brake valve in the emergency position of the brake valve for operating said switch to open the regenerative brake circuit.

4. The combination with means for applying air brakes to a railway train unit and means for applying electric braking to the same unit, the two braking means being each normally separately operable, of means for making an emergency application of the air brakes, and means responsive to an emergency application by the train operator but unresponsive to a break in the train pipe for rendering the electric braking inoperative.

In testimony whereof I have hereunto set my hand.

WALTER V. TURNER.